Oct. 15, 1963 C. O. DUKES 3,106,740
CLEANING TOOL FOR MEAT TENDERIZERS
Filed July 19, 1962
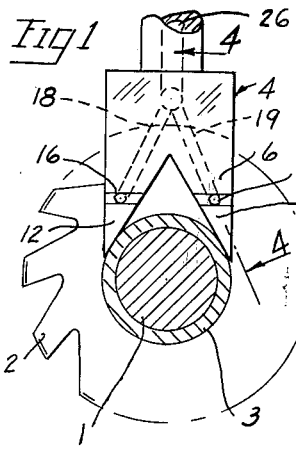
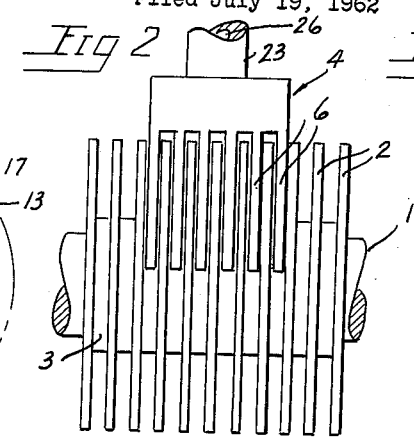
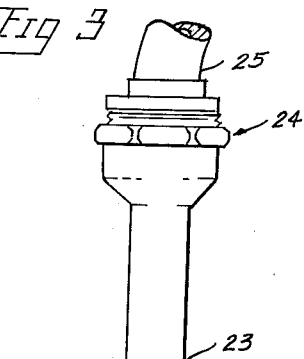
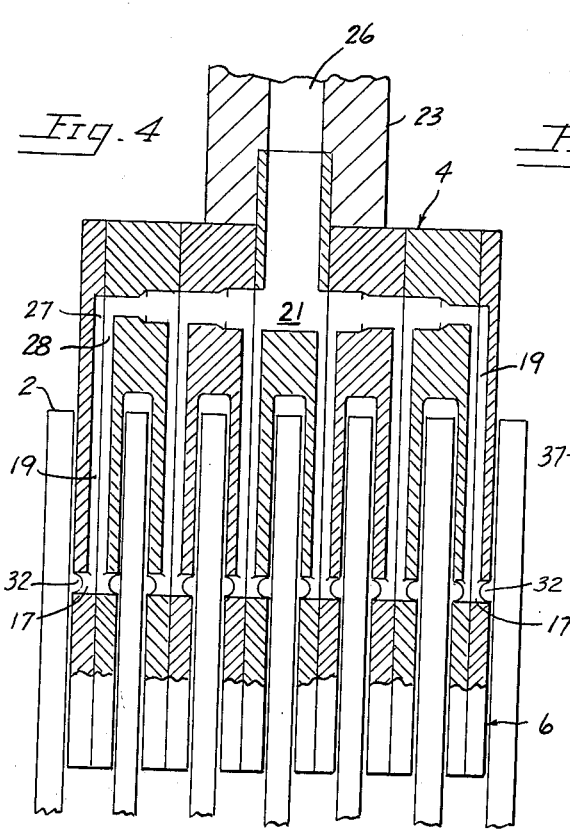
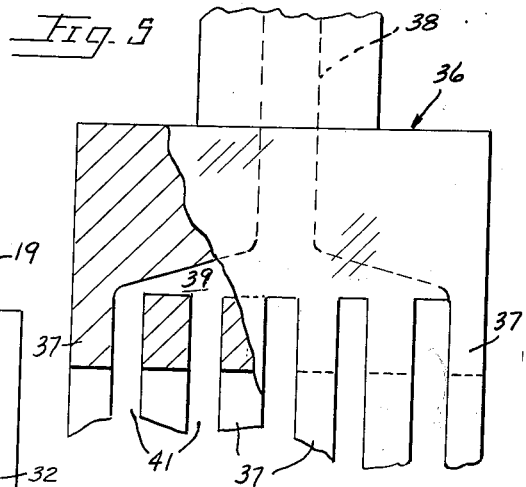
INVENTOR.
CLIFFORD O. DUKES
BY
Gordon Wood

United States Patent Office 3,106,740
Patented Oct. 15, 1963

3,106,740
CLEANING TOOL FOR MEAT TENDERIZERS
Clifford O. Dukes, Rte. 1, Box 292A, Talent, Oreg.
Filed July 19, 1962, Ser. No. 210,979
5 Claims. (Cl. 15—512)

This invention relates to a tool for cleaning meat tenderizers of the type having a plurality of equally spaced apart coaxial cutting disks mounted for rotation on a common shaft.

The primary object of the invention is the provision of a cleaning tool for cleaning tenderizing machines and which tool is more efficient and effective than those now available.

Tenderizers of the type contemplated herein are extremely difficult to keep clean due to the fact that the cutting disks are very closely spaced apart and there is a great tendency for the meat processed by the machines to adhere to the sides of the cutting disks so that particles of meat become inaccessible. If such meat particles are permitted to remain on the tenderizer disks the same becomes spoiled thus ruining the tenderizer for its intended purpose. Examples of tenderizers of the type contemplated by the present invention are shown in United States Letters Patents Nos. 2,364,533 and 2,513,025.

Heretofore, attempts have been made to provide a specially designed cleaning tool having blades which are adapted to be received between the opposed faces of adjacent disks of the tenderizer so as to effect a scraping action between the blades and the disks as the latter rotate on their common shaft. However, due to the close spacing between the disks, such devices have resulted in ineffectual cleaning of the tenderizer since they do not insure that all particles of meat are removed from the spaces between the disks. An example of such a tool is shown in United States Letters Patent No. 2,633,594.

One of the main objects of the present invention is the provision of a tool which includes means for introducing a fluid under pressure into the spaces between the disks so as to carry away the particles of meat that have been loosened by the blades of the tool.

Another object of the invention is the provision of a tool that is simple to operate and inexpensive to manufacture.

Other objects and advantages of the invention will be apparent from the following specification and drawings:

FIG. 1 is a typical cross section through a tenderizer shaft which carries the cutting disks and showing the preferred form of the invention in cleaning position.

FIG. 2 is a side elevation of the structure of FIG. 1.

FIG. 3 is a side elevation of the cleaning tool shown attached to a hose for conducting a cleaning fluid thereto.

FIG. 4 is a greatly enlarged vertical sectional view of the tool showing the internal conduits.

FIG. 5 is a view similar to FIG. 4 showing a modified form of the invention.

In detail, and first with reference to FIGS. 1 and 2, the invention is adapted to be employed with a tenderizer that is provided with two rotatable shafts each provided with a gang of equally spaced apart cutting disks. In FIGS. 1 and 2 only one shaft is shown with its associated cutting disks, it being understood that the operation of cleaning the disks on the other shaft is the same as that to be described. The shaft is indicated at 1 and the cutting disks are indicated at 2. The disks are spaced apart by means of spacers 3 which surround the shaft 1.

The invention includes a working head generally designated 4 which is formed to provide a plurality of equally spaced apart blades 6 adapted to fit within the spaces between adjacent disks of the tenderizer. The blades 6 are each preferably provided with a relatively large downwardly opening notch forming a pair of slantingly disposed spacer engaging edges 7, 8 (FIG. 3). As best seen in FIG. 1 edges 7, 8 are adapted to engage the outer peripheries of the spacers 3 when the tool is in working position. The angular teeth 12, 13 formed by the downwardly opening notch are provided with holes 16, 17 respectively extending transversely through the blades and communicating with longitudinally extending passageways 18, 19 (FIG. 1) which in turn communicate at their corresponding upper ends with a relatively large transversely extending passageway 21 (FIG. 4).

Attached to the upper end of head 4 is an elongated tubular handle generally designated 23 which is provided at its opposite end with a hose fitting 24 for connection to a hose 25. Extending longitudinally through handle 23 is a bore 26 which communicates at its lower end with the transversely extending passageway 21.

By the above described structure it will be seen that fluid, which may be plain water or chemically treated water, may be conducted through hose 25 and handle 23 into the head 4 and out through the terminal orifices formed by holes 16, 17.

Since the blades 6 are relatively thin the head 4 may be formed by laminations as shown in FIG. 4 in which case the opposed faces of the laminations may be formed by grooves 27, 28 which, combined, form the passageways 18, 19. Said laminations may be adherently secured together by a suitable adhesive. The passageways may, on the other hand, be formed by drilling or in any other suitable manner.

In operation, with the handle 23 attached to the hose 25 so as to discharge water under pressure through the terminal orifices 16, 17 the operator may apply the tool to the tenderizer at points along the length of the shaft so as to clean particles of meat from the space between the disks and from the disk surfaces and at the same time carry away such particles by means of the fluid discharged through the orifices. It will be understood that the device not only cleans the tenderizer of meat particles but also steel shavings which might be present after the cutting blades have been sharpened in the usual manner.

It will be understood that the thickness of the blades 6 is almost equal to the spacing between disks 2 so as to achieve a scraping action between the blades and the disks. Because of the tight fit it is preferable to provide surface grooves 31, 32 (FIGS. 3, 4) on blades 6 communicating with the holes 16, 17 respectively so as to insure the discharge of the fluid along the opposed faces of the disks which is necessary and desirable to achieve the contemplated cleaning action.

A modified form of the invention as shown in FIG. 5 wherein a head 36 is formed with blades 37 in like manner as the structure of FIG. 4 but, instead of the longitudinally extending passageways formed in the blades, fluid is merely conducted to the outer peripheries of the disks from central bore 38 to an enlarged cavity 39 formed in the head 36 and which cavity communicates along the central plane of the head with the spaces 41 between the blades 37. This structure provides an effective radially inwardly direct stream of fluid along the opposed surfaces of the cutting disks and is suitable for use if the tenderizer is cleaned frequently. However, if the particles deposited on the cutting disks have been allowed to harden the structure shown in FIGS. 1–4 is more effective.

As stated above, the tool may be made very sanitary by forming the same of plastic or layers of plastic as described above and by adherently securing the head to a plastic tube to form handle 23.

It will be understood that the above specifically described preferred embodiments of the invention are not

I claim:

1. A cleaning tool for a meat tenderizer of the type including a plurality of equally spaced apart coaxial cutting disks mounted together for rotation on a common shaft and having a central cylindrical member cooperating with adjacent pairs of blades to form a plurality of annular radially outwardly opening spaces, said tool comprising:

an elongated handle.

a cleaning head carried by one end of said handle and provided with a plurality of spaced apart blades each adapted to be received within one of said annular spaces and of sufficient length to reach said central cylindrical member for engaging the sides of said disks to clean the same upon rotation of said shaft, and conduit means formed in said head and communicating with the spaces between said blades for conducting fluid into said annular spaces between said disks.

2. A tool according to claim 1 wherein said handle is provided with a longitudinally extending bore in communication at one end with said conduit and provided at its other end with a hose fitting and hose connected thereto.

3. A tool according to claim 1 wherein said conduit means includes passageways formed in said blades and terminating in orifices directed toward said disks.

4. A tool according to claim 3 wherein the opposite faces of said blades are provided with grooves communicating with said orifices for directing fluid along the opposed faces of said disks.

5. A tool according to claim 1 wherein said conduit means includes passageways formed in said blades and extending parallel to the opposite faces of said blades and terminating in holes extending between opposite faces of said blades for directing fluid against the sides of said disks.

References Cited in the file of this patent

UNITED STATES PATENTS

| | | |
|---|---|---|
| 179,318 | Jenks | June 27, 1876 |
| 464,843 | Bagger | Dec. 8, 1891 |
| 2,036,449 | Weatherhead | Apr. 7, 1936 |
| 2,633,594 | Robbins | Apr. 7, 1953 |